Patented May 9, 1939

2,158,043

UNITED STATES PATENT OFFICE 2,158,043

SELF-PRESERVING SEMISOLID FOOD PRODUCT FROM DISTILLER'S SLOP

William P. M. Grelck, Baltimore, Md.

No Drawing. Application February 23, 1938,
Serial No. 192,067

4 Claims. (Cl. 99—5)

The invention relates to a process for the production of a food material and to the product obtained. More particularly it pertains to an animal feed prepared from a distiller's slop and includes correlated improvements and discoveries whereby the qualities of such a feed are enhanced.

Grains like corn, rye and grain malt are largely used in the production of alcohol for beverage purposes. The grains and malt are crushed and mashed with from 6 to 7 times its weight of water. The mash is then subjected to suitable temperatures to gelatinize all or part of its starch content, then cooled and by the addition of yeast subjected to alcoholic fermentation. At the end of such alcoholic fermentation the fermented mash is drawn through a distilling apparatus, the alcohol distilled off or separated from it, the remaining fluid, usually called distillers' slop or waste, contains the non-fermentable suspended fibrous solids and the soluble solids in more or less colloidal condition of the grain material used, including acid, mainly lactic acid, normally to the extent of about 0.4%. The non-fermentable fibrous solids suspended, together with the dissolved solids, may vary normally from 4% to 8% in such slop. A considerable portion of the crude protein is changed and brought into more digestible form by the fermenting process, therefore the distillers' slop when fresh is considered a valuable supplementary feed for animals, but when a day or more old it decomposes easily and becomes unfit as a food.

An object of my invention is the provision of a process in accordance with which a distiller's slop may be converted into a stable and palatable food substance.

Another object of the invention is to provide a feed material in a wet semi-solid form which contains non-soluble and soluble solid constituents of a distiller's slop as the principal ingredients, and a self-preserving quantity of lactic acid.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

The preserving of the suspended and dissolved ingredients of distillers' slop may be effected by first separating or screening off the suspended or fibrous particles of the fruit and seed shell of the grains and malt used, subject the wet screened particles to pressure to reduce the moisture content further so that it ranges from 60% to 75%. The second step consists in grinding said wet fibrous particles by means of a suitable grinder to a smooth appearing paste. The third step consists in concentrating the remaining milky fluid which passed through the screen, containing the soluble solids and suspended solids of such size as pass through an 80 or a 100 mesh screen, in suitable vacuum apparatus which may be of single or multiple effect, to from $\frac{1}{5}$ to $\frac{1}{10}$ of its original volume according to the original amount of solids and the final density desired. It is evident that such concentration in vacuo increases its lactic acid content in proportion to its initial amount and that such lactic acid content is made use of for the self-preservation of the finished product. The four step consists in bringing together the finely ground paste containing the fibrous fruit and seed shell particles of the grain and malt used, with the concentrated liquid containing the soluble matter and part of the suspended solids which pass through the screen and mixing the same to a homogeneous paste of semi-solid consistency. From 100 lbs. of distillers' slop I obtain about 6 lbs. to 8 lbs. of finely ground paste containing the fibrous particles of the grains and malt used, the liquid passing through the screen is concentrated by removing from it from 75% to 85% surplus moisture so as to contain approximately from 18% to 30% of total solids including lactic acid, resulting in from 10 lbs. to 15 lbs. so that the total yield of the finished semi-solid product containing the finely ground paste of the wet fibrous particles and the concentrated liquid may be from 15 lbs. to 22 lbs. from 100 lbs. of normal distillers' waste. Through the concentration of the liquid, the lactic acid content is brought to a self-preserving quantity of from 2% to 3% of the finished product. However, the figures as stated may vary. The fifth step consists in packing said semi-solid mass in air-tight containers to be sold as food.

The separation of the suspended fibrous particles of the fruit and seed shell or so called hulls of the grain and malt used, is performed in the usual manner by passing the fresh hot slop over an arrangement of screens of from 80 to 100 mesh, then removing the screened particles which contain at this stage about 80% to 85% moisture from said screen or strainer, then passing said fibrous particles or screenings on to a set of rollers or press for the purpose of further pressing out surplus moisture so that the remaining moisture of said screenings may range from 60% to 75%. The remaining fluid containing a small part of the fibrous solids and the soluble or colloidal solids as it passes through the screen is then concentrated in vacuo or other suitable means by removing its surplus moisture and timing said removal so that the concentrated fluid contains about from 18% to 30% solids including a self-preserving quantity of lactic acid. The suspended wet fibrous particles separated from the original liquid or slop may be ground to a fine paste and then mixed with the concentrated liquid as described, or the concentrated liquid may be mixed with the separated suspended fibrous particles and then the mixture subjected to grinding. The object of grinding the screened suspended fibrous particles is to cause them to be more completely digested, and to make a more homogeneous finished semi-solid product.

To increase the biological qualities of the finished product in its content of vitamins or food factors or hormones, ground animal organs such as liver, glands, glandular extracts, colloidal iodine compounds and the like may be added and hence increase its value as a supplementary feed for animals.

In practicing my invention I prefer to proceed for example as follows: I take about 1,000 lbs. of fresh distillers' slop from corn or rye mash containing all of the non-fermentable residue as discharged from the distilling apparatus. Such slop normally contains from 4½% to 7% total solids of which about ⅓ of the total solids consists of suspended fibrous particles and about ⅔ of dissolved or colloidal solids. The slop is passed over a screen of from 80 to 100 mesh, for the purpose of separating the suspended fibrous particles from the slop, then pressing additional moisture from the screened or separated suspended fibrous particles so that the wet mass of the same contains about 65% moisture, yielding about 70 lbs. Then grinding the wet fibrous mass to a fine smooth appearing paste by means of an attrition mill or other suitable grinder. The fluid which passes through the screen contains about ⅔ of the original solids, is then concentrated in vacuo to about ⅐ its original volume so as to contain from 18% to 30% total solids, of which from 2½ to 3½% is lactic acid. I then mix this concentrate with the finely ground paste, resulting in a homogeneous appearing mass of semi-solid consistency, containing a self-preserving content of lactic acid. Then packing the same in airtight barrels or other suitable containers, to be sold as a food.

The obtainment, more particularly, of a self-preserving quantity of lactic acid will be clear from the following considerations: normal distillers' slop contains about 6% total solids consisting of 2% suspended solids and about 4% or ⅔ of the same of soluble solids. By removing or screening the suspended solids consisting of the fruit and seed shell of the grains and malt used, from 1,000 lbs. of distillers' waste or slop containing 6% total solids, I obtain about 70 lbs. of screenings in semi-solid form containing 20 lbs. of suspended solids and 50 lbs. of moisture i. e. about 70% including about 0.45% lactic acid, the remaining 930 lbs. of fluid containing about 4% soluble solids including 0.45% acid figured as lactic acid, is now placed in an evaporator, about 810 lbs. of moisture is removed from the same by evaporation in vacuo so that the remaining fluid of about 120 lbs. contains about 30% solids or seven times its original amount, including 2.8% lactic acid, which is about one twelfth of the combined weight of suspended and soluble solids. The previously obtained 70 lbs. of screenings are finely ground either before or after mixing the same with the 120 lbs. of concentrate obtained by removing the desired surplus moisture from the screened liquid. In recombining or mixing the wet screenings of 70 lbs. with 120 lbs. of concentrate, a total of 190 lbs. of finished semi-solid self-preserving distillers' waste or slop is obtained, containing approximately the following analysis: 60 lbs. of total solids including 4½ lbs. of lactic acid and 130 lbs. of moisture, figured by percentage 31.6% total solids including 2.37% lactic acid.

By the foregoing procedure there is produced a wet food product that is semi-solid in consistency and contains as its principal ingredients non-soluble suspended solids of distillers' slop together with soluble solids present therein in concentrated form, including a self-preserving quantity of lactic acid.

This application is a continuation in part of my copending application Serial No. 82,455 filed May 29, 1936.

Since certain changes in carrying out the above process, and certain modifications in the product which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process for the preparation of a self-preserving acid food product of semi-solid consistency from distillers' slop, which comprises separating suspended fibrous solids in semi-solid form from liquid to contain from about 60 to about 75% of moisture, concentrating the thus separated liquid which contains soluble solids and lactic acid of the slop until a soluble solids content of from about 18 to about 30% and a preservative quantity of about 2 to about 3.5% lactic acid is contained therein, and combining concentrated liquid with suspended fibrous solids.

2. A process for the preparation of a self-preserving acid food product of semi-solid consistency from distillers' slop, which comprises separating suspended fibrous solids in semi-solid form from liquid to contain substantially 70% of moisture, grinding separated solids to a paste, concentrating the thus separated liquid which contains soluble solids and lactic acid of the slop until a soluble solids content of from about 18 to about 30% and a preservative quantity of about 2 to about 3.5% lactic acid is contained therein, and combining concentrated liquid with suspended fibrous solids.

3. A process for the preparation of a self-preserving acid food product of semi-solid consistency from distillers' slop, which comprises separating its suspended fibrous solids in semi-solid form to contain substantially 70% of moisture, concentrating the remaining fluid containing the soluble solids by removing a quantity of moisture so as to contain substantially 30% total solids including a preservative quantity of lactic acid substantially equal to one twelfth by weight of the combined suspended and soluble solids, combining the mass containing the suspended fibrous solids with the concentrate containing the soluble solids, grinding to a smooth paste, and then packing in air-tight containers.

4. A wet food product of semi-solid consistency containing as its principal ingredients non-soluble suspended solids of distillers' slop together with soluble solids of the same in concentrated form, including a self-preserving quantity of lactic acid.

WILLIAM P. M. GRELCK.